United States Patent [19]

Marquardt et al.

[11] Patent Number: 4,497,836
[45] Date of Patent: Feb. 5, 1985

[54] MODIFIED WHEY PRODUCT AND PROCESS INCLUDING ULTRAFILTRATION AND DEMINERALIZATION

[75] Inventors: Robert F. Marquardt, Danville; Harold T. Pederson, Jr., Livermore; Leo H. Francis, Burlingame, all of Calif.

[73] Assignee: Dairy Technology Ltd., Baraboo, Wis.

[21] Appl. No.: 405,995

[22] Filed: Aug. 6, 1982

[51] Int. Cl.$^3$ .............................................. A23C 21/00
[52] U.S. Cl. ..................... 426/239; 426/491; 426/583; 426/801
[58] Field of Search ............... 426/583, 491, 495, 239, 426/801

[56] References Cited

U.S. PATENT DOCUMENTS

| | | | |
|---|---|---|---|
| 2,465,907 | 3/1949 | Meade et al. | 426/271 |
| 2,604,403 | 7/1952 | Wiechers | 426/801 |
| 2,631,100 | 3/1953 | Aten et al. | 426/239 |
| 2,695,235 | 11/1954 | Goede | 426/583 |
| 3,201,245 | 8/1965 | Clark et al. | 426/239 |
| 3,201,256 | 8/1965 | Clark et al. | 426/583 |
| 3,320,072 | 5/1967 | Clark et al. | 426/239 |

FOREIGN PATENT DOCUMENTS

| | | | |
|---|---|---|---|
| 7800265 | 7/1978 | Netherlands | 426/583 |
| 2044771 | 10/1980 | United Kingdom | 426/583 |

OTHER PUBLICATIONS

Marshall et al., 'Fractionation and Concentration of Whey by Reverse Osmosis', *Food Technology*, vol. 22, 974 Aug. 1968.

Horton, B. S., 'Prevents Whey Pollution, Recovers Profitable By-Products', *Food Engineering*, Jul. 1970, pp. 81–83.

*Primary Examiner*—Robert Yoncoskie
*Assistant Examiner*—Elizabeth C. Weimar
*Attorney, Agent, or Firm*—Kenyon & Kenyon

[57] ABSTRACT

A process for producing whey derived products suitable for use in infant food formulas from edible cheese whey. The cheese whey is subjected to ultrafiltration to produce a protein-rich retentate and a lactose-rich permeate. The permeate is then partially demineralized as by electrodialysis, and blended with the protein-rich retentate. Also products produced by the process.

7 Claims, 2 Drawing Figures

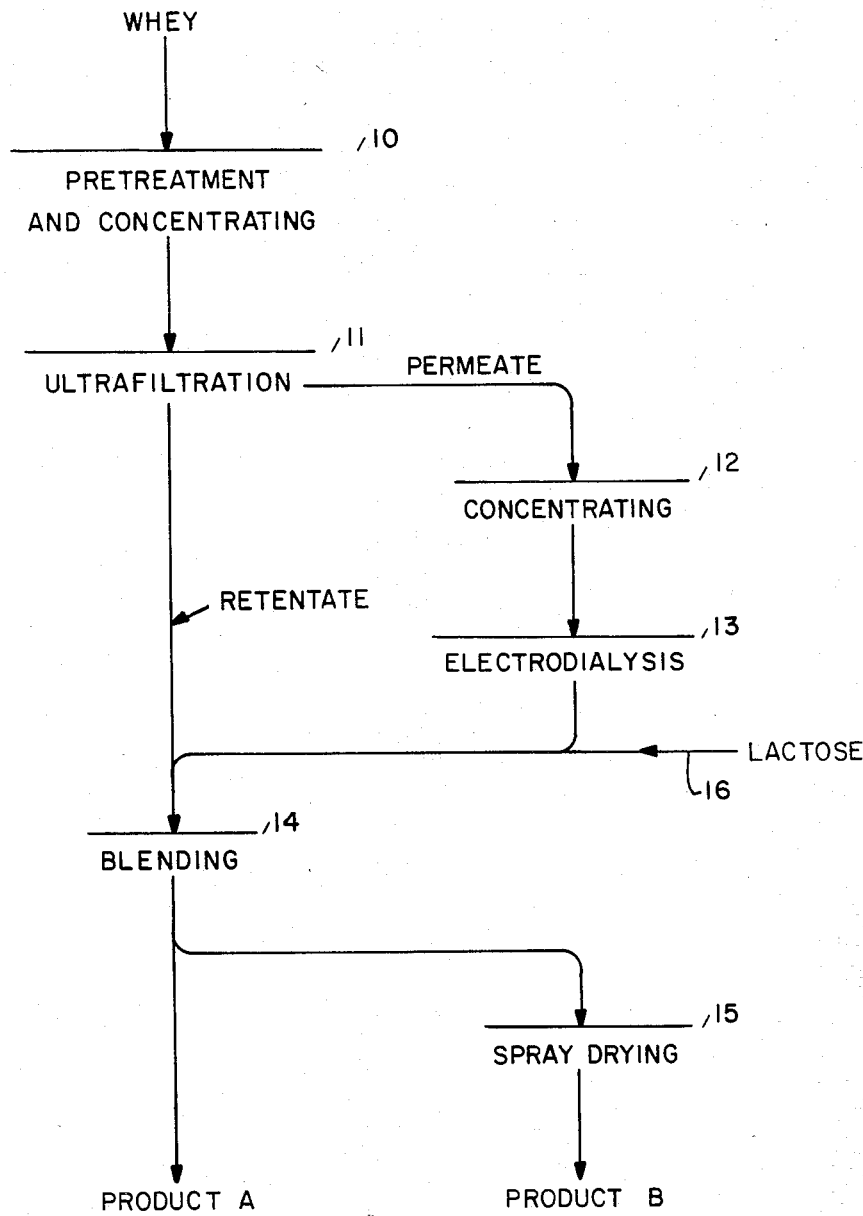
FIG.—1

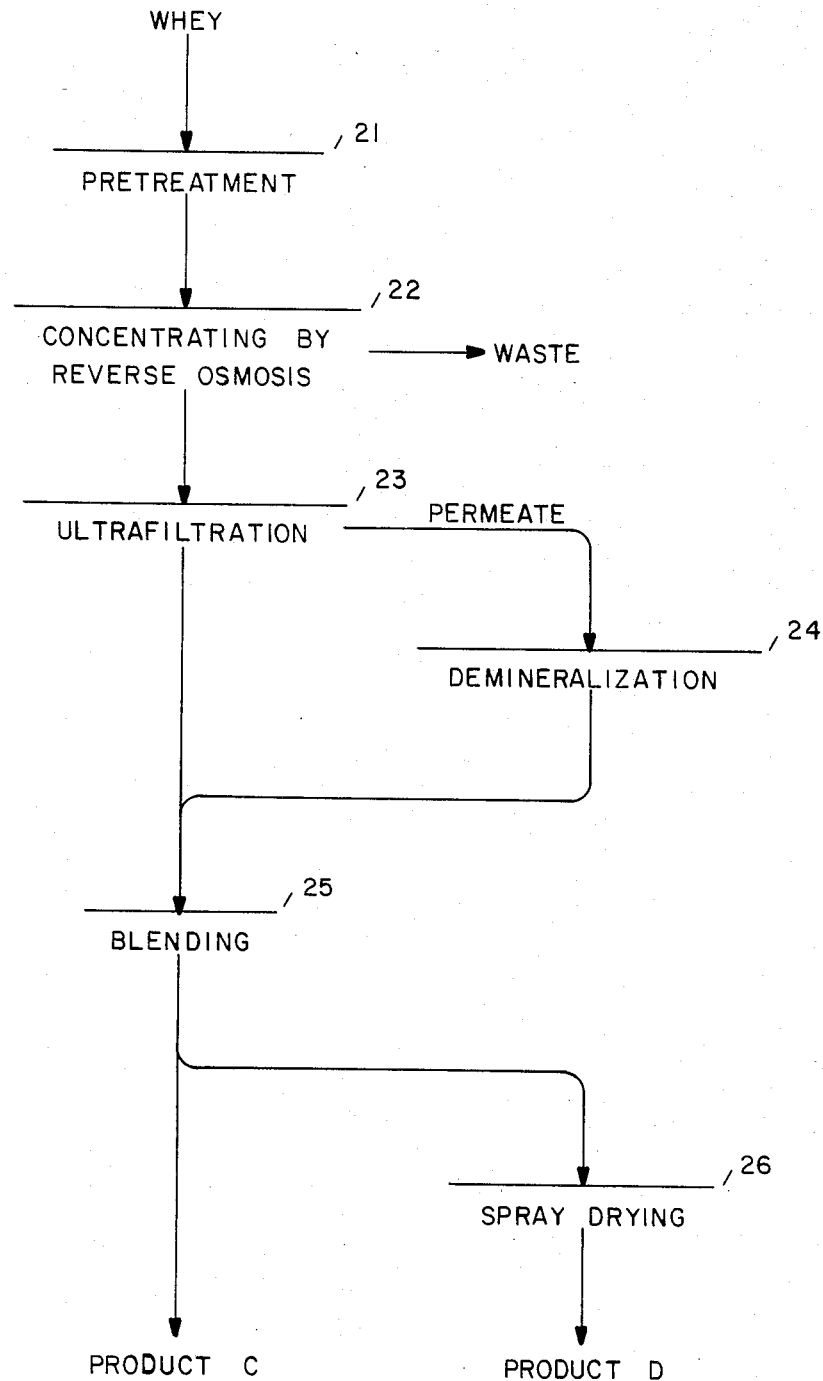
FIG.—2

MODIFIED WHEY PRODUCT AND PROCESS INCLUDING ULTRAFILTRATION AND DEMINERALIZATION

This invention relates generally to whey protein concentrates and method for their manufacture. Particularly it relates to such products as are useful in the manufacture of infant formulas.

Sweet and acid cheese wheys have been widely used as a source of nutrients in the formulation of food products for humans and animals. The processing of such wheys has included partial demineralization as by electrodialysis or ion exchange resin, for flavor improvement and to provide a mineral salt content that is acceptable for the intended use. Such wheys may also be processed to produce whey protein concentrates having protein levels substantially higher than in natural whey. Such processes include removal of a substantial amount of the lactose content as by crystallization, or by membrane fractionation which serves to fractionate whey into a protein rich retentate, and a lactose rich permeate. By the use of membrane fractionation whey protein concentrates can be prepared with protein levels ranging from 20-90%.

Infant formulas which simulate the composition of human milk, are sold in both dry powder and fluid forms. In the manufacture of the fluid form, the formulated product is introduced into cans or other containers that are sealed, and then retorted to effect heat sterilization. The retorting temperature may be of the order of 240°-300° F., and the cans or other containers may be subject to such temperatures for periods of the order of twenty minutes. It is essential that the liquid product, when subjected to such sterilizing treatment, and other processing treatment preceding sterilization, should retain its desired fluidity and dietetic values. When whey protein concentrate is included in such formulas, it has been noted that the treatment during processing, including final sterilization, frequently results in deterioration of the product, particularly in that gelation and thickening occurs during sterilization and subsequent storage.

Irrespective of the chemical and physical changes which occur in connection with such thickening, the net result is that the product becomes unmarketable. Judging from research work of which we are aware, this difficulty is due to lack of stability of the whey protein. More specifically during the overall processing, including final heat sterilization, the protein is heat denatured to the point where it imparts gelation to the entire product. The present invention is directed to effecting a solution to this difficulty, and particularly it makes possible the use of whey protein in infant formulas that can be heat sterilized without objectionable thickening or gelation.

While infant formulas in dry powder form are not subjected to such heat sterilization after packaging, sterilization by heat treatment is employed during processing of the component ingredients, and may be applied after the product is reconstituted with water.

It is an object of the present invention to provide a whey protein concentrate product which is suitable for formulation with other ingredients to provide infant formulas that remain stable after being heat sterilized.

Another object is to provide a whey protein concentrate product which when formulated with other food products can be heat sterilized in sealed cans without serious thickening or gelation.

Another object is to provide a relatively simple and economical process for the manufacture of such whey products.

Another object is to provide a controllable process which will produce infant formulas having a predetermined composition that will comply with prescribed specifications.

In general, products in accordance with the present invention consist of whey solids having a whey protein content substantially greater than the protein of natural raw edible whey. The protein content is derived from the retentate fraction produced by ultrafiltering cheese whey. The product also has a lactose content which is preferably obtained by the ultrafiltration of cheese whey and the controlled partial demineralization of the resulting lactose rich permeate as by electrodialysis. The process comprises subjecting a cheese whey having its protein content in undenatured form to membrane fractionation, to thereby produce a protein rich retentate fraction and a lactose rich fraction. The permeate fraction is subjected to electrodialysis to reduce its mineral salt or ash content to a predetermined value. The electrodialyzed permeate fraction may then be blended with the retentate fraction to form a product suitable for use as an instant formula ingredient.

Referring to the drawing.

FIG. 1 is a flow diagram illustrating one procedure for carrying out the process.

FIG. 2 is a flow diagram of another embodiment.

In general the present process makes use of both membrane fractionation, and demineralization for reducing the ash content. However the two operations are applied in such a manner that the final blended product has its whey protein in such form that it remains stable throughout further processing, such as the processing involved in the manufacture of infant formulas. According to the embodiment of the process shown in the drawing, the source edible whey, which may be acid or sweet whey, is first subjected to pretreatment 10, which can include pasteurizing, removal of fat or lipid complexes, and concentrating. It may also include some pH adjustment to near neutrality (e.g. 6.0-6.4 pH). Pasteurization should be at temperatures and for periods of time insufficient to cause any substantial denaturing of the whey protein. Preferably pasteurization equipment of the continuous type is used which may heat the whey to a temperature of about 161°-166° F. for a short period of about 15-20 seconds, depending upon its solids content. Concentrating may be carried out by reverse osmosis, or by vacuum evaporation. Any heat treatment in connection with concentrating should likewise be at temperatures and for periods of time which do not cause any appreciable protein denaturation. The fat content can be reduced by various methods, such as filtration, centrifuging, or both, or by flocculation followed by filtration or centrifuging. It is desirable that the fat content be reduced to a value of the order of 0.1% or less (DSB dry solids basis). With respect to concentrating the whey it is desirable in this embodiment that the concentrate have a solids content of the order of 12 to 15% for economical subsequent treatment.

In the next step 11 the concentrate from 10 is subjected to the ultrafiltration form of membrane fractionation, to provide a protein rich retentate, and a lactose rich permeate. The mineral salt content of the whey, before ultrafiltration, may be of the order of 8 to 9%. A substantial portion of the mineral salt content of the whey, as for example from 50 to 90%, is discharged with the permeate, the remainder staying with the retentate. With the whey feed temperature ranging from about 100° to 140° F., the small amount of heat generated during ultrafiltration only minimally effects the outgoing temperatures of the protein concentrate and permeate fractions.

After concentrating the permeate in step 12, it is subjected to demineralization 13. Concentration may be carried out by vacuum evaporation and/or by reverse osmosis. Demineralization can be carried out by electrodialysis apparatus and processing as disclosed in U.S. Pat. Nos. 3,544,436 dated Dec. 1, 1970 and 3,755,134 dated Aug. 28, 1973. The amount of mineral salts removed in this step is controlled in accordance with the specifications for the final product. By way of example in a particular instance the permeate supplied to electrodialysis 13 may have a mineral salt content of the order of 9 to 12% (DSB) and electrodialysis may reduce the mineral salt content to the order of 0.15 to 0.6%.

In step 14 the protein rich retentate from step 11 is shown being blended with the demineralized permeate from step 13. This produces product A, which has a composition depending upon the control of the ultrafiltration and electrodialysis steps, and the proportions used in the blending step 14.

The product and process as described above has a number of unexpected advantages. When demineralization by electrodialysis is applied to whey, it has been found that some changes occur in the physical and/or chemical nature of the whey protein. While the reasons for these changes are not clearly understood, it is believed that they may be due at least in part to localized heating which tends to occur as the material passes through the electrodialysis stacks. Also it may be due to pH and desalting effects which modify the buffering capacity of the system. Ultrafiltration of whey does not involve any substantial heating, and therefore the whey protein is not affected.

Electrodialysis of the permeate does not result in any appreciable deterioration of protein, because very little protein is present in the permeate fraction. Also electrodialysis does not have any detrimental effect upon the lactose content or other solids present. The small amount of protein present in step 13, is insufficient to materially effect the characteristics of the blended product produced in step 14.

Another unexpected beneficial result produced by the above process, is that the final blended product possesses a substantial amount of nitrogen compounds other than protein, generally referred to as non-protein nitrogen (NPN). The presence of NPN in the final product is deemed to be dietetically beneficial. The major part of such NPN present in the original whey, passes with the permeate fraction. It is not destroyed, impaired or removed to a substantial degree of electrodialysis applied to the permeate. Therefore the substantial amount of NPN is effectively retained in the permeate and is present in the final product.

The indicated product A is fluid and in a typical infant formula manufacturing operation, it is blended with other food and flavoring ingredients, such as non-fat milk solids, vegetable fat, sugar, vitamins and stabilizers, and the blended product homogenized. The product is then introduced into cans which are sealed and subjected to conventional retorting for heat sterilization. Due presumably to the manner in which the whey protein is treated in the processing, it has sufficient inherent stability to withstand retorting without causing thickening or gelation.

In some instances it may be desirable to convert the product A to dry powder form, instead of utilizing it to formulate a liquid food product, such as formulated infant milk. Thus the fluid product A may be converted to dry powder form by spray drying 15, to produce the dry product B. This product may be blended with other dry powder ingredients to form a mixture which can be reconstituted by the addition of water to provide an infant formula ingredient, or it may be stored in dry form and blended with other ingredients at the time the infant formula is being prepared.

In the event a product is desired in the form of a dry powder, the retentate and the electrodialyzed permeate may be separately spray dried and blended together in proportions suitable for the desired composition, either before or at the time they are being blended with other food ingredients.

The formulation of the infant food may require a lactose content in excess of that obtained by the procedure described above. In such instances additional lactose can be added in the blending operation 14, as indicated by line 16. The additional lactose may be one which has been produced by electrodialysis comparable to the electrodialyzing operation 13. However since the added lactose is relatively small in amount compared to that which is derived from the electrodialyzing operation 13, it may be a refined or purified lactose, which for example may be one refined by a process such as disclosed in the U.S. Pat. No. 4,202,909 dated May 13, 1980 or by other known lactose refining methods. With the addition of a refined lactose to supplement that produced by operation 13, it may be desirable to make a compensating adjustment of the electrodialysis operation 13. For example the electrodialysis operation can be adjusted to reduce the percentage of mineral salts being removed, thus compensating for the fact that mineral salts are not added with supplemental lactose as indicated by line 16.

In some instances it may be desirable to supply the retentate from operation 11 and the permeate from operation 13, directly to a blending operation which serves to blend these ingredients with additional food ingredients to produce a desired final product, for example an infant formula.

While electrodialysis of permeate is a satisfactory and preferred controllable method for demineralizing permeate to produce a lactose concentrate of predetermined mineral salt content, other demineralizing methods are known and may be used, as for example ion exchange making use of anionic and cationic ion exchange resin columns through which the feed material is caused to flow sequentially.

With respect to providing a base of whey protein product A having a predetermined composition with respect to protein, lactose and mineral salt contents, this involves controlling step 11 to produce a retentate of desired protein content, and a permeate having the bulk of the lactose content of the feed whey. Step 13 is controlled to provide a lactose having a predetermined mineral content. When blended together in step 14 the proportions must be such as to provide the desired protein level, and the desired lactose and mineral salt contents. As previously mentioned additional lactose can be supplied when desired and this may be refined lactose, or a lactose rich permeate that has been partially demineralized. When such an additive is supplied its mineral salt content must be known and taken into account in proportioning the ingredients for a desired composition. The composition of the mineral salts in the final product may also be adjusted, as by adding certain salts desired.

Reference has been made to use of reverse osmosis for concentrating the whey preceding ultrafiltration and for concentrating the permeate in step 12. Either of these treatments are preferably carried out by the use of membranes having a salt (NaCl) rejection characteristic within the range of about 35-75% instead of a salt (NaCl) rejection characteristic within the range of about 93-98% which is normally used for reverse osmosis. Such special reverse osmosis serves to remove a substantial amount of mineral salts, and particularly the remaining ash consists mainly of calcium and magnesium salts. This is desirable since it minimizes the amount of monovalent salts (sodium and potassium) in the final products thus providing products that are more dietetically acceptable.

FIG. 2 shows another embodiment of the process in which a special form of membrane fractionation is used in step 22 prior to the conventional ultrafiltration step 23. The pretreatment step 21 in this instance may be the same as the pretreatment 10 of FIG. 1, except that the whey may not be concentrated by evaporation, but by the step 22.

Instead of using membranes having a salt (NaCl) rejection characteristic within the range of 93-98%, as in standard RO practice, membranes of substantially lower rejection characteristics are employed, such as membranes referred to above having a salt rejection characteristic within the range of about 35-75%. As previously explained, by carrying out reverse osmosis with the use of membranes having a salt rejection characteristic as just specified, fractionation of the mineral salts occurs, with the bulk of the monovalent salts being removed in the permeate. The bivalent salts remaining with the whey, consist mainly of calcium and magnesium salts. In effect such reverse osmosis treatment of whey carries out partial demineralization of the whey, fractionation of the mineral salts, and simultaneous concentration of the whey. Concentration may be to a level of the order of 12 to 30% solids, depending upon control of the reverse osmosis operation, obtained for example by controlling the feed pressure, varying the total affective area of the membrane or varying the number of membrane modules employed. Assuming that the source whey has an ash content of about 8-9% (DSB), the ash content of the protein rich fraction may be reduced to about 6 to 6.5% (DSB), if reverse osmosis concentration of step 22 to about 24-28% solids is practiced.

The lactose rich permeate from step 23 is shown being further demineralized in step 24. For example about 20-35% of the ash content of the whey may be removed in step 22 and from about 25-95% of the remaining ash removed in step 24, thereby providing a partially demineralized lactose which may have ash contents ranging to as low as 0.1% (DSB). As previously stated the protein rich retentate from the ultrafiltration step 23 may have a residual ash content of the order of 1.4 to 3.5% (DSB). Step 24 is preferably carried out by electrodialysis, although as with the process shown in FIG. 1, other methods of demineralization can be used, such as by contact with ion exchange resins.

The fluid lactose from step 24 may be blended at 25 with the protein rich fraction from step 23 to provide the product C, corresponding to the product A of FIG. 1. The blended fluid may also be spray dried in step 26 to produce the dry powder product D, corresponding to product B.

Further with respect to the process of FIG. 2, in a typical instance the permeate from ultrafiltration 23 may have a total solids content of about 10-11%. The composition of the solids (DSB) may be about 9% mineral salts, 6% protein material, and 85% lactose. The composition of the mineral salts may be about 47% of monovalent (sodium and potassium) salts and about 53% bivalent (calcium and magnesium) salts. The protein rich fraction may have a total solids content of from 25 to 30%. The composition of the solids (DSB) may be about 3% mineral salts, 50% protein, and 46% lactose.

Examples of the invention are as follows:

EXAMPLE 1

The source material for this example is raw fresh low acid Mozzarella cheese whey of edible quality. It should be low heat whey in that there must be no significant denaturation of the protein content. The hydrogen ion concentration of such whey was about pH 6.3, and the total solids content about 7%. The whey may analyze as follows:

|  | Percent (DSB) |
| --- | --- |
| Protein | 13.1 |
| Lactose | 77.9 |
| Fat | 0.7 |
| Ash | 8.3 |
| NPN (non-protein nitrogen) | 0.5 |

Pretreatment is carried out as described in U.S. Pat. No. 3,447,930 dated June 3, 1969 to reduce the fat content to about 0.1%. More specifically the whey is pasteurized by passing it through a tube type preheater where it is rapidly heated to about 161° F. and held for a period of about 15 seconds. It is then concentrated to about 20-25% total solids by passing it through a vacuum evaporator of the collandria type with three effects. During vacuum evaporation the whey should not be heated to a temperature in excess of about 155° F., whereby there is no significant denaturation of the protein content. After a storage period during which the concentrate is cooled, it is reheated to about 120° F. and the hydrogen ion concentration adjusted within the limits of pH 6.2 to 6.4 by the addition of potassium hydroxide. The concentrate is then clarified by centrifuging in a bowl type intermittent unloading clarifier. This serves to remove small quantities of insoluble suspended casein, and to remove a part of the fat content. After such pretreatment the fat content should be not more than 0.1% (DSB). Operation 11 may be carried out by the use of ultrafiltration equipment made by Abcor Inc. of Cambridge, Mass., sold under the tradename of ABCOR and using HMF type membranes providing 370 sq. ft. membrane area. The porosity of such membranes is about 18,000 molecular weight cut off. The Abcor equipment consists of a plurality of serially connected membrane modules manifolded in such a manner that the feed flows successively from one group of parallel modules to the next group. Ultrafiltration serves to fractionate the whey whereby in a typical instance the protein fraction analyzes as follows:

|  | Percent (DSB) |
| --- | --- |
| Protein | 50.0 |
| Lactose | 42.6 |
| Ash | 3.8 |
| Fat | 3.5 |
| NPN | 0.23 |

The permeate fraction may analyze as follows:

|  |  | Percent (DSB) |
| --- | --- | --- |
| Protein |  | 5.4 |
| Lactose |  | 85.3 |
| Fat | less than | 0.1 |
| Ash |  | 9.3 |
| NPN |  | 0.6 |

The permeate is adjusted to about 15% solids. The concentrate is then subjected to electrodialysis, which is carried out by utilizing the electrodialyzing process and apparatus disclosed in U.S. Pat. Nos. 3,544,436 dated Dec. 1, 1970 and 3,755,134 dated Aug. 28, 1978. The bulk of the mineral salts is thereby removed to produce a partially demineralized product consisting mainly of lactose, and analyzing substantially as follows:

|  |  | Percent (DSB) |
| --- | --- | --- |
| Protein |  | 5.6 |
| Lactose |  | 93.9 |
| Fat | less than | 0.1 |
| Ash |  | 0.5 |
| NPN |  | 0.5 |

About 78% of the original protein content of the whey is in the retentate fraction, and only about 22% in the permeate. Also about 10% of the ash content of the whey is in the retentate, and about 89% is in the permeate. In addition only about 19% of the non-protein nitrogen is in the retentate, whereas the bulk of such material, namely about 81%, is in the permeate.

It will be noted from the above that electrodialysis does not materially reduce the non-protein nitrogen content of the permeate. In the blending step 14, the amount of solids received as retentate from ultrafiltration and the amount of solids received from electrodialysis 13, is proportioned to provide a desired analysis of the blended material A. In a typical instance the product A may analyze as follows:

|  | Percent (DSB) |
| --- | --- |
| Protein | 18.5 |
| Lactose | 80.0 |
| Ash | 1.3 |
| NPN | 0.17 |

In practice the composition of the blended product A may be within ranges as follows, depending upon such factors as the protein level of the retentate from step 23, the composition of the demineralized permeate from step 24, and the proportioning of the retentate and permeate in the blending step. These factors can be controlled to produce a product A of a desired composition.

|  | Percent (DSB) |
| --- | --- |
| Protein | 14 to 43 |
| Lactose | 48 to 82 |
| Ash | 1.0 to 3.0 |
| Fat |  |
| NPN | 0.5 to 0.6 |

Products A produced as in the foregoing example have been tested for protein stability. Particularly such products can be formulated with other food ingredients to produce a fluid infant formula, and this product can be introduced into cans, the cans sealed, and then subjected to conventional retorting, using retorting temperatures of about 240°–300° F., over a period of about 20 minutes, after which the cans are chilled with cold water. In such overall processing, including final heat sterilization, there will be no appreciable increase in viscosity of the formula, and no objectionable gelation will occur.

EXAMPLE 2

The procedure is substantially as shown in FIG. 2, and the source whey is assumed to be the same as in Example 1. Pretreatment 21 is as described for step 10 except that the whey is not pre-concentrated. Reverse osmosis step 22 is carried out as previously described to produce a partially demineralized whey that is concentrated to 10–15% solids with an ash content of about 8.5%. The permeate liquor containing mainly monovalent salts and water is sent to waste. The conventional ultrafiltration step 23 is controlled to produce a lactose permeate analyzing (DSB) substantially as follows:

|  | Percent (DSB) |
| --- | --- |
| Protein | 5.4 |
| Lactose | 87.1 |
| Ash | 7.5 |
| Total Solids | 15–20 |

After demineralization step 24 the lactose fraction may analyze as follows:

|  | Percent (DSB) |
| --- | --- |
| Protein | 6.0 |
| Lactose | 93.2 |
| Ash | 0.8 |

The protein rich fraction from ultrafiltration step 23 may have a solids content of about 15–30% and an analysis may range as follows:

|  | Percent (DSB) |
| --- | --- |
| Protein | 35.0–90.0 |
| Lactose | 8.5–61.25 |
| Fat |  |
| Ash | 1.4–3.5 |
| NPN | 0.1–0.25 |

The fluid protein fraction from 23 and the lactose fraction from 24 may be blended at 25 in such proportions as to provide a product C having a solids content of about 21% and analyzing as follows:

|  | Percent (DSB) |
| --- | --- |
| Protein | 18.5 |
| Lactose | 80.0 |
| Fat |  |
| Ash | 1.3 |
| NPN | 0.2 |

In general products A may vary substantially in NPN content, as for example from 0.17% to 0.6%.

In the foregoing description particular reference has been made to the production of infant formulas. While the invention is particularly applicable to the manufacture of such products, it is also deemed applicable to other food products for infants, adolescents or adults having whey protein as a constituent, such as for example special dietary formulas for complete or supplemental nutrition.

What is claimed is:

1. A process for producing a whey derived product having a substantially undenatured whey protein content substantially greater than the protein content of raw edible source whey and a mineral salt content that is less than that of such whey comprising, the steps of subjecting edible whey to membrane ultrafiltration to produce a protein-rich retentate fraction and a lactose-rich permeate fraction, the permeate fraction having a mineral salt content of about 9–12%, dry solids basis, derived from the source whey, subjecting the permeate to demineralization to reduce its mineral salt content about 0.15–0.6%, dry solids basis, and blending the demineralized permeate with the protein-rich retentate fraction in such proportions as to provide desired lactose and mineral salt contents in the blended product.

2. The product produced by the process of claim 1.

3. The product produced by the process of claim 1.

4. A process for preparing a modified whey product, which comprises separating a feed whey comprising protein, water, lactose and mineral salts by ultrafiltration to produce a protein-rich fraction and a permeate fraction including a substantial portion of the water, lactose and mineral salts;

demineralizing the permeate fraction to reduce its mineral salt content; and blending the demineralized permeate fraction with the protein rich fraction forming the modified whey product wherein the mineral salt content is less than that of the feed whey and the protein is unaffected by the demineralization and is heat stable.

5. The process recited in claim 4, wherein: the mineral salts removed from permeate fraction are predominantly monovalent salts.

6. The process recited in claim 5, wherein: the demineralization is effected by reverse osmosis.

7. The process recited in claim 4, wherein: the demineralization is effected by electrodialysis.

* * * * *